ent [19] [11] 3,858,209
Zulch [45] Dec. 31, 1974

[54] RADAR MOVING TARGET TRACKING SYSTEM

[75] Inventor: Donald I. Zulch, Oneida, N.Y.

[73] Assignee: The United States of America as represented by the Secretary of the United States Air Force

[22] Filed: July 27, 1962

[21] Appl. No.: 214,173

[52] U.S. Cl.............. 343/7.7, 343/5 CD, 343/5 SA, 343/9
[51] Int. Cl.............................................. G01s 9/42
[58] Field of Search........ 343/7.7, 8, 9, 5 CD, 5 SA, 343/18 E, 5, 18

[56] References Cited
UNITED STATES PATENTS
| | | | |
|---|---|---|---|
| 3,150,363 | 9/1964 | Finvold | 343/18 E X |
| 3,327,124 | 6/1967 | Plum | 343/18 E X |
| 3,439,208 | 4/1969 | Gallard et al. | 343/5 CD X |

Primary Examiner—T. H. Tubbesing
Attorney, Agent, or Firm—Wade Koontz

EXEMPLARY CLAIM

1. In a radar moving target indicator system having a transmitter periodically radiating pulses of high frequency radiant energy and a receiver receiving reflections of the energy by an intercepted target and converting said reflections into corresponding video signals, each target when experiencing uncoordinated attitude flight manifesting such instability by uncontrolled tumbling which is evidenced by amplitude modulation characteristics of said video signals, means in said receiver for extracting the amplitude modulation component of video signals resulting from a tumbling target, and display means using the extracted amplitude modulation component for indicating the rate of tumbling.

8 Claims, 5 Drawing Figures

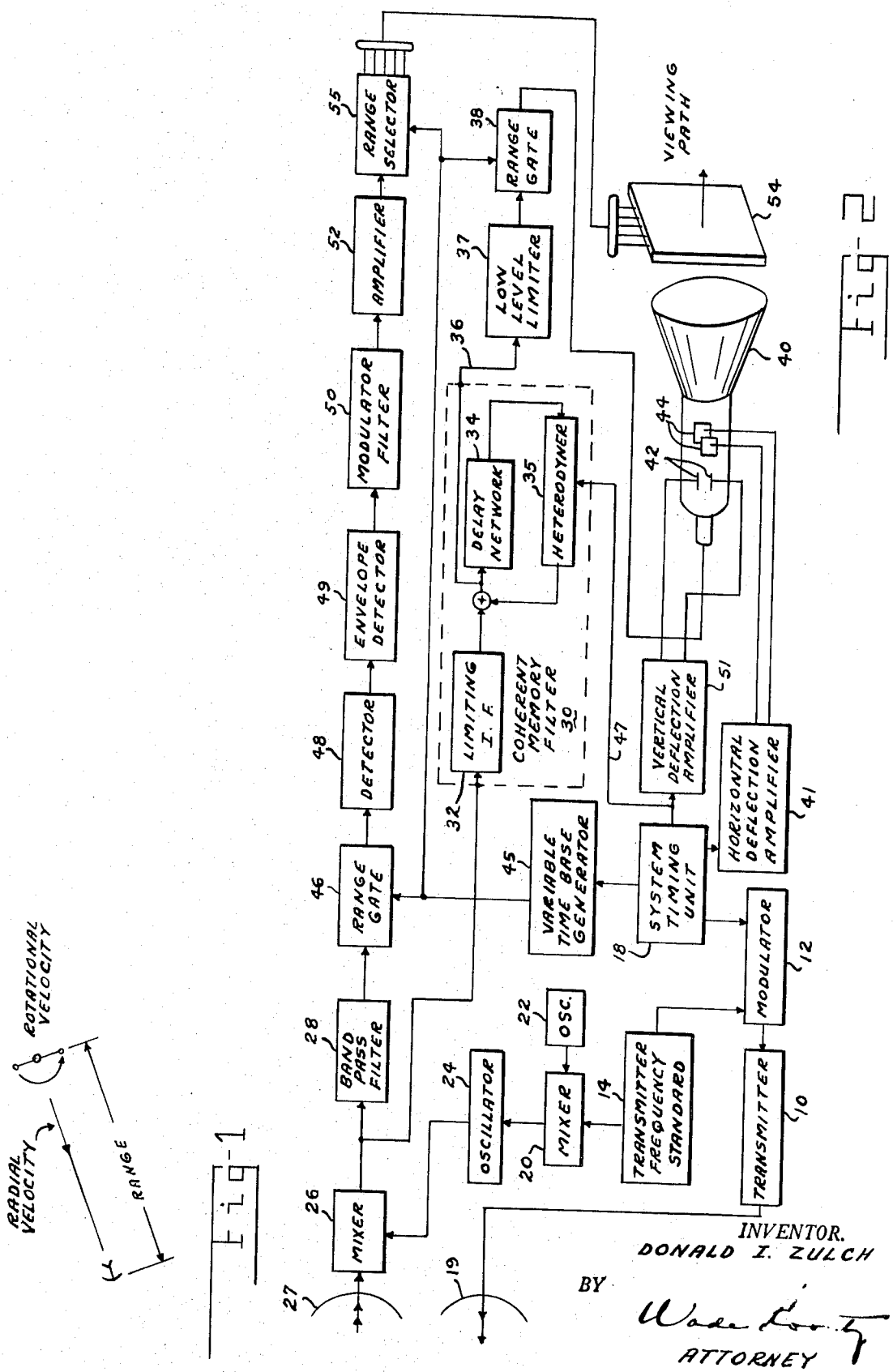

INVENTOR.
DONALD I. ZULCH
BY Wade Kountz
ATTORNEY

RADAR MOVING TARGET TRACKING SYSTEM

The invention described herein may be manufactured and used by or for the United States Government for governmental purposes without payment to me of any royalty thereon.

The present invention relates to a radar moving target indicating system and, particularly, to a system for providing a visual demonstration of the departure of an object under radar surveillance from attitude controlled flight.

In the organization of defense systems for guarding against attack by enemy ballistic missiles, certain data regarding the nature of a detected object or missile must be considered expediently in order to provide sufficient time for defensive measures. Deception tactics of enemy forces may involve the launching of nonstrategic objects called decoys simultaneously with actual missiles in the hope of diverting intercept devices from as many missiles as possible. While certain pertinent target data can be obtained by means of conventional radar tracking equipment, such as range, azimuth, and radial velocity, there remains a need in present radar tracking systems for a system capable of distinguishing without confusion between a missile proper and a decoy whenever either enters an area in which responsibility for radar coverage exists.

For a missile to reach its assigned target and complete its mission an automatic attitude control system for the missile of necessity will be employed. Other objects launched only for decoy purposes will lack inherent senses for correcting stabilization errors and therefore uncontrollable tumbling of such objects will be expected to occur. Such attitude instability will manifest itself in the form of modulation of the amplitude of echo signals reflected by the target to the receiving antenna of the ground radar system.

Accordingly, an object of the invention is a radar moving target tracking system for indicating tumbling of a detected object having radial velocity relative to the tracking station.

A further object of the invention is the provision of a radar moving target tracking system in which tumbling or nonstabilization of a detected moving object is recognized in terms of amplitude modulation return echoes converted to electrical signals convenient for display.

Another object of the invention is the provision of a radar moving target tracking system wherein radial velocity and range information of a detected moving object or target are presented in a two-coordinate position display simultaneously while providing visual information of the tumbling rate of the object.

Yet another object of the invention is a radar moving target tracking system wherein signals representing the rate of tumbling of a detected moving target or object control an optical color filter whose color transmitted in response to electrical stimulation proportionally varies at the tumbling rate.

To accomplish the foregoing objects, a radar moving target tracking system of the present invention is adapted to provide information regarding the slant range, radial velocity, and rotational velocity of an object or target whose trajectory following launching brings it into the scanning sphere of the radar system. Dictating the approach to the invention is the presumption that rotational movement or tumbling of a ballistic missile should not occur if the desired accuracy and flight path are to be achieved. Means are therefore provided in the invention for converting amplitude variations in reflected signals returned from a tumbling object into representative electrical signals and, in accordance with the amplitude modulation envelope, energizing a voltage-sensitive optical color filter mounted in front of a cathode ray tube on which slant range and radial velocity information simultaneously are present. Under exterior stimulation by the luminous spot on the face of the cathode ray tube screen, the color that the optical filter will pass varies directly to the degree of the applied voltage so that a clear and readily recognizable color demonstration of the tumbling rate of the object being tracked is achieved.

A complete understanding of the invention and an introduction to other objects and features not mentioned specifically may be had from the following detailed description of a specific embodiment thereof when read in connection with the appended drawings, in which:

FIG. 1 diagrammatically shows an object or missile intercepted by a radar detection system, the range, radial velocity, and rotational velocity of the object being determined by the system of the present invention;

FIG. 2 is a schematic presentation in block diagram form of the radar moving target tracking system of the present invention;

Figure 3:
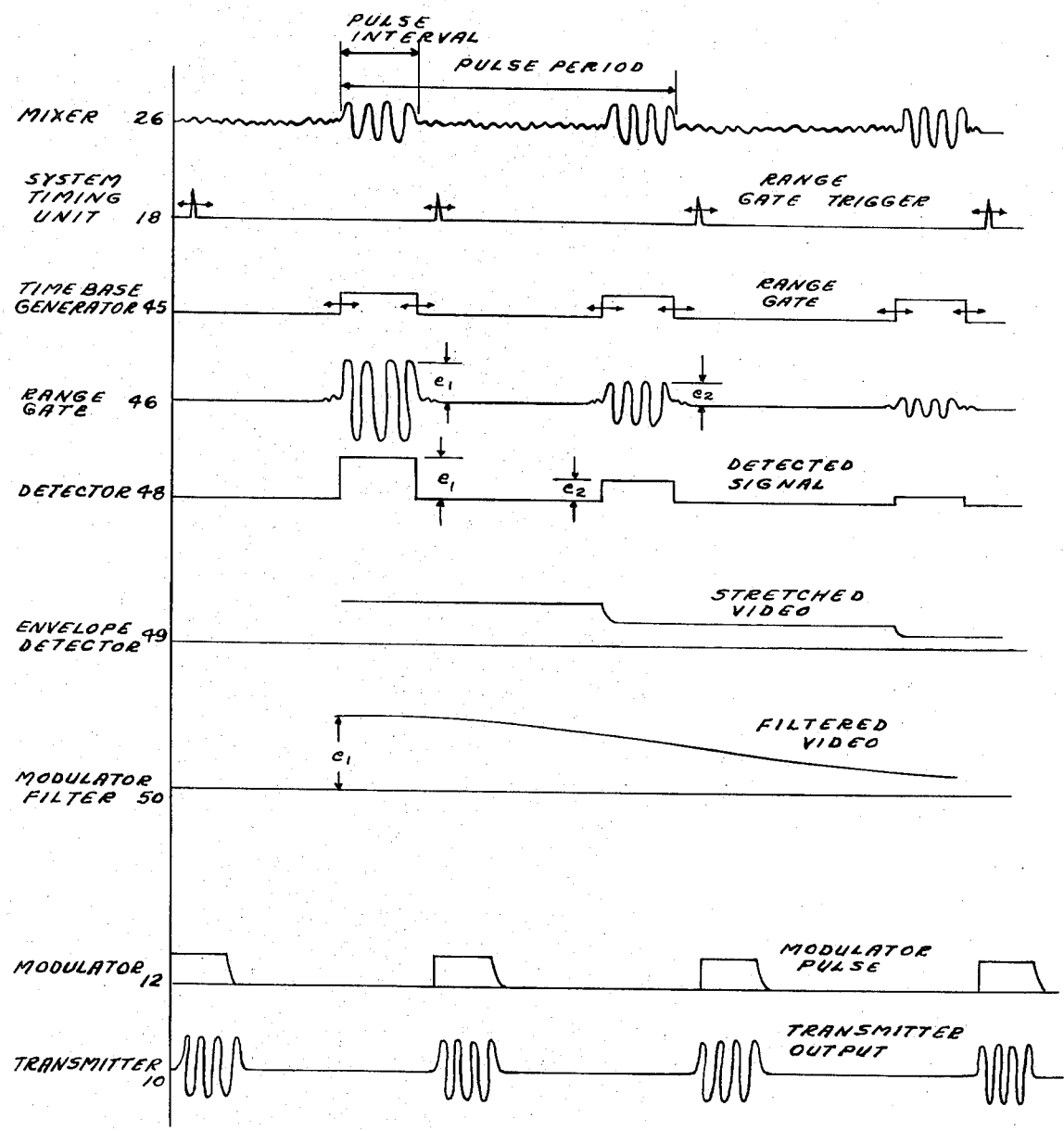
FIG. 3 shows, in a time-related sequence, the waveforms of several signals at various points in the radar moving target system shown in FIG. 2.

Referring now to FIG. 1, the system of the invention is adapted to provide the following information: the slant range of a target from a fixed installation; the radial velocity of the target; and the degree of rotational velocity about the reference axes, should any occur. In the following description, consideration is given to the opinion that rotational movements of a detected object about its reference axes is an indication of nonstabilized flight due to intentional failure to provide or sustain attitude control balance. Therefore, it is assumed that attitude stability is characteristic of actual missiles whereas decoys experience unstabilized flight evidenced by uncontrollable tumbling.

The system according to the invention for obtaining the aforementioned data regarding a moving object is shown in FIG. 2. There a transmitter 10 which may comprise a magnetron or other suitable element providing radiant energy is driven by a modulator 12 operating preferably at a frequency of 450 MC, as controlled by a transmitter frequency standard 14. Pulse synchronization of modulator 12 is initiated by a system timing unit 18. A suitable pulse repetition rate for transmitter 10 may be 30 cps and, for purposes of this description, the radar system is intended to operate with a pulse width of 2 ms and a pulse interval of approximately 33 ms. The signal produced by transmitter 10 is applied to a suitable directional antenna 19 and consists of radio frequency exploratory pulses of short duration.

Signal energy at the frequency of transmitter 10 is fed to a mixer 20 from transmitter frequency standard 14.

Applied as a second input to mixer 20 are oscillations from an oscillator 22 whose output frequency is approximately 30 MC. The beat frequency output of mixer 20 includes a signal equal to the difference in frequency between the carrier frequency of the exploratory pulses from the frequency of oscillator 22. This latter signal is isolated from the other resultant signals of mixer 20 by an oscillator 24 and is applied as a continuous wave reference to a mixer 26 in the receiver section.

A radar pulse transmission system of the character described above, wherein local generation of reference oscillations takes place, is often referred to as a coherent pulse-echo system.

Reflected echo pulses are received at an antenna 27 and are passed into mixer 26 whose second input consists of the oscillations from oscillator 24. In mixer 26 the echo pulses are reduced to an intermediate frequency equal to the frequency of oscillator 22 plus or minus the Doppler frequency. The output of mixer 26 is applied to a band pass filter 28 having a bandwidth broad enough to pass the total anticipated intermediate frequency band resulting from the Doppler effect. As is known, the Doppler effect is that phenomena wherein waves reflected by a moving object are returned to a stationary receiver at a frequency which differs slightly from the frequency of the outgoing wave. By isolating the corresponding Doppler signal from the reflected energy, a signal proportional to the radial velocity of the target may be obtained.

The radial velocity information is provided by a coherent memory filter generally designated 30 and whose elements include a limiting IF, delay network, and heterodyner referenced 32, 34 and 35, respectively. The output of mixer 26 is the Doppler-shifted IF frequency $(f_{if} \pm f_d)$ and is applied as the input to the limiting IF 32 of the coherent memory filter.

Considering now specifically the operation of the coherent memory filter 30, if an input to delay network 34 is assumed to have the form $$e(t) = E \cos (k\ 2\pi/T)t \tag{1}$$

where $E$ is the amplitude of the incoming signal, $k$ is an integer, and $T$ is the length of delay of delay network 34, the input signal will make a transit through the feedback loop exactly $k$ times each period and upon leaving heterodyner 35 will reach the summation point in the loop in time to combine in-phase with the sinusoidal input. Thus, linear in-phase addition of all sinusoidal signals present at the summing point occurs every $T$ seconds. Stated differently, each circulation of a sinusoidal signal in the coherent memory filter terminates at the summing point in the signal augmented by the circulating signal. From the following notation $$\theta_D = k\ 2\pi/T + \Delta\omega T \tag{2}$$

which describes the phase difference between the delayed and undelayed signals, a signal whose radian frequency is $\omega$ may be integrated by the coherent memory filter if a periodically varying phase advance of $\Delta\omega t$ radians is introduced in the feedback loop. For optimum use of coherent memory filter as a useful spectrum analyzer, the input signals which it can accommodate are restricted to the range in which $$k\ 2\pi/T < \omega < (k+1)2\pi/T \tag{3}$$

Following this supposition, it may be stated that a signal whose spectrum is confined to a band $1/T$ cps wide may uniquely be determined by its complex values when examined at intervals $T$.

Based on this theorem, continuous observation and processing of a band-limited signal is unnecessary since analysis of the signal to obtain the desired information may be done every $T$ seconds. In the system of the invention, this periodic inspection of the input signal is achieved conveniently by inserting heterodyner 35 in the feedback loop of the coherent memory filter which gives rise to a circuit capable of distinguishing separately a large number of discreet signals separated in frequency by a predetermined $\Delta f$. The frequency $\Delta f$ which heterodyner 35 introduces to the feedback loop is the phase advance frequency and is equal roughly to 31 kc or $1/T$, where $T$, the delay length of network 34, equals 32 $\mu s$. The constant phase advance of heterodyner 35 at the aforementioned frequency is ensured by injecting into heterodyner 35 from system timing unit 18 over lead 47 a train of timing pulses having the period $T$, so that the rate of phase shifting of the coherent memory filter is time coincident with the delay interval imposed. Ultrasonic quartz lines have been found suitable for the function accomplished by delay network 34.

Figure 5:
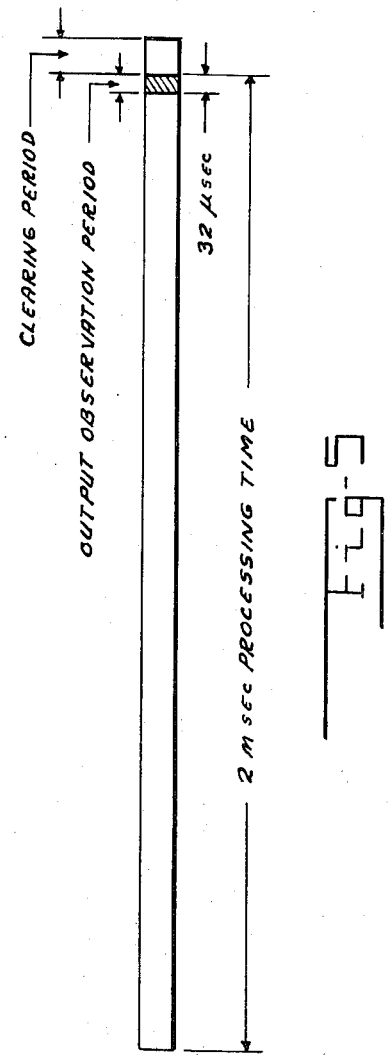
FIG. 5 shows the operating cycle of the coherent memory filter which forms a part of the radar moving target tracking system of FIG. 2.

The time in coherent memory filter 30 given to processing an input signal to determine its Doppler component is 2 ms and the output on line 36 is observable during the last 32$\mu s$ of the processing period. Thus, one cycle of operation of coherent memory filter proceeds as shown in FIG. 5. The output observation period is followed by a brief clearing period of several microseconds after which the processing cycle is repeated as incoming echoes arrive. The signal obtainable through the action of coherent memory filter 30, as observed during the 32$\mu s$ examination period, thus occurs at an instant which is linearly time related to the Doppler-shifted IF frequency of the input signal. Doppler frequency proportional signals taken from coherent memory filter 30 are supplied to a low level limiter 37 arranged to suppress the lower part of each signal which, in practice, has been found to consist of spectral impurities of side lobe level. A coherent memory filter completely conforming to the abovementioned operating characteristics of the coherent memory filter embodied in the present invention is commercially available from Federal Scientific Corporation. It will be observed, moreover, that while the invention uses a coherent memory filter of the type described for extracting from return echoes a Doppler signal proportional to radial velocity, other means well known in the art exist for accomplishing Doppler signal extraction and may, with suitable variation, be substituted for the coherent memory filter shown with no loss of Doppler signal resolution.

It is apparent that in order to cover a range of ballistic missile velocities, coherent memory filter 30 must have a relatively broad band characteristic to ensure response to the frequencies corresponding to the anticipated velocity range. Reasonable radial velocities of objects may be expected on the order of up to 20,000 NM per hour. For velocities of this magnitude, the Doppler frequency $f_d$ which may occur can be calculated by the expression $$f_d = (2v_r \cdot f_0)/c \qquad (4)$$

where $v_r$ is the radial velocity of the intercepted object, $f_0$ is the transmitter frequency, and $c$ is the velocity of light. At an object radial velocity of 20,000 NM per hour, the Doppler frequency will be approximately 30.8 kc. The signal spectrum which coherent memory filter 30 must be capable of analyzing should therefore cover at least the range of 0 – 30.8 kc. Since the spectral range of coherent memory filter 30 is proportional to 1/$T$, and as previously stated a delay $T$ of 32$\mu$s is employed, a display of Doppler frequency components up to approximately 31 kc of signal spectrum may be obtained from the invention. As can be seen, such a spectrum is well suited to the Doppler variations anticipated.

The output of limiter 37 is applied through a range gate 38 to the intensity modulating electrode of a cathode ray tube 40. The horizontal deflection voltage for deflection plates 44 of cathode ray tube 40 suitable to the ranging desired is provided by a horizontal deflection amplifier 41 synchronized in the system by a timing pulse from system timing unit 18. A vertical deflection amplifier 51 fed also by the timing pulses appearing on line 47 supplies deflection plates 42 of cathode ray tube 40 with a vertical sweep voltage. Since the period of the sweep voltage applied to vertical deflection plates 42 is 32$\mu$s, which is seen to be integrally related to the interval of the observation period of return signals undergoing evaluation in coherent memory filter 30, it will be understood that the vertical sweep deflection voltage is time synchronized with the readout period of coherent memory filter 30. The simultaneous application of deflecting voltages to both the horizontal and vertical deflection plates forms a trace substantially of raster form and for each radial velocity signal applied to the intensity modulated electrode of cathode ray tube 40 through range gate 38 an intensified spot on the face of the tube appears.

Range gate 38 which controls the passage of radial velocity signals to cathode ray tube 40 is gated by a variable time base generator 45. Variable time base generator 45 may be adjusted either manually or automatically in a manner well established in the art to inject into the system a time variable which corresponds continuously to the range of the object being tracked. Radial velocity signals therefore intensity modulate the beam of cathode ray tube 40 only at time coinciding with the instantaneous radial velocity of a detected target, and the time base of the horizontal deflecting voltage is such as to cause intensification of the beam at a point giving a linear representation of the target range. The interior coating on cathode ray tube 40 preferably is of P–4 phosphor capable of emitting white light and having the proper persistency for the vertical and horizontal sweep times involved.

Information regarding the rotational velocity of an intercepted object is contained in reflected echoes which are converted to the intermediate frequency signals at the output of mixer 26. The fact that the attitude movements of an object are uncoordinated is evidenced by variations in the amplitude of successive reflected echoes. Successive intermediate frequency signals at the output of mixer 26, when the detected object is tumbling, therefore will be amplitude modulated by a degree depending on the instantanous profile of the object to transmitted energy reaching it. Band pass filtering of the intermediate frequency signal of mixer 26 is accomplished by filter 28, as hereinabove explained. A range gate 46 also gated by variable time base generator 45 causes the output of filter 28 to be blanked out at all times except during the time corresponding to the region in range which contains the detected object. Range gate 46 therefore is centered around the range area of interest, as shown in FIG. 3. A detector 48 converts the periodically varying video signals which are passed through range gate 46 to unidirectional amplitude varying pulses by clipping the negative portions thereof. This leaves consecutive positively going rectangular pulses (FIG. 3) each having an amplitude proportional to the cross-section of the target at the time of its reflection of transmitted energy. An evelope detector 49 develops a signal whose amplitude varies according to the instantaneous amplitude of each rectangular signal from detector 48, the output supplied having an amplitude varying signal resembling a descending staircase of voltage levels. One form which envelope detector 49 may take in the illustrated embodiment is a diode clamp-capacitor combination (not shown) arranged to hold the amplitude of each rectangular pulse from detector 48, with the capacitor adjusting to the level of incoming pulses and the diode clamp permitting the capacitor to discharge to the lower level of each successive pulse. The higher frequencies present in the output signal of envelope detector 49 are removed by a modulator filter 50 to obtain a signal having a frequency in accordance with the envelope of the original signal modulation of the 450 MC wave. The output of modulator filter 50 thus consists of a filtered video signal whose frequency represents the rate of change of cross-section of a tumbling target and so is proportional directly to the tumbling rate of the target. The signal from modulator filter 50 is converted to a directly proportional direct current voltage by an amplifier 52 and is raised by the amplifier to a voltage level sufficient to excite an optical color filter 54 having a number of vertically oriented sections each of which may be selectively actuated.

Interposed between amplifier 52 and the color filter 54 is a range selector 55 gated by the gate signal from variable time base generator 45 and functioning in the present system to control which section of color filter 54 is exposed to energizing current. Range selector 55 may comprise, in one embodiment, a commutator having several output terminals each selectively being connected with its input terminal according to the range information applied thereto by variable time base generator 45. The output of amplifier 52 is therefore directed selectively to one of the output terminals of range selector 55 according to the range of the target. Range selector 55 thus serves as a device through which the rotational velocity proportional signals may be directed to appropriate sections of color filter 54.

A discussion of optical color filters of the type employed in the present system is presented by V. A. Babits and H. F. Hicks, Jr., in Electronics, November 1950, and in U. S. Pat. No. 2,493,200. While such color filters are well known, their properties will be discussed briefly.

Figure 4:
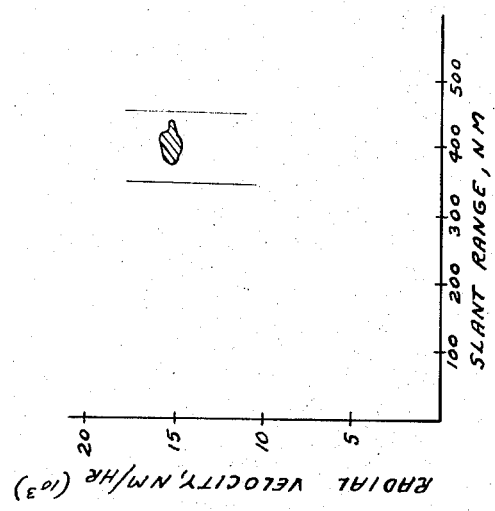
FIG. 4 shows a preferred manner in which target indications obtained by the apparatus of the invention may be displayed.

Color filter 54 exhibits the property of birefringence, or double refraction, so that when electrically stressed the color of light which the filter can transmit when illuminated by incident light varies according to the magnitude of the exciting voltage. The color transmission characteristics of filter 54 may involve numerous colors depending on the filter properties and the strength of the stressing signal. In the present invention, the color seen will vary according to the amplitude of the rotational velocity signal directed through range selector 55. A typical choice of a color sequence may include the use of red, blue and green colors. Color filter 54 is placed in front of the cathode ray tube 40 in such a manner that it can sense the existence of the bright spot of the screen due to intensity modulation of the beam. Range and radial velocity calibration markings may be inscribed on color filter 54 by any suitable means. Thus, markings calibrated to represent radial velocity limits appropriate to the detection system in which the present invention is to be used may be vertically inscribed on color filter 54 to overlap the vertical axis of the cathode ray tube. The upper marking may, for example, represent an object radial velocity of 20,000 NM per hour. Similarly, horizontally along color filter 54 there may be applied a suitable scale coinciding with the horizontal axis of the cathode ray tube in accordance with the range of the particular system. An observer of the cathode ray tube looking along the viewing path in the direction of the arrow will therefore see a target as it appears in FIG. 4, the exaggerated spot on the cathode ray tube representing range and radial velocity coordinates and the color transmitted by color filter 54 being indicative of the rotational velocity rate of the object. The vertical lines on color filter 54 shown in FIG. 4 represent one of the sections of the color filter selected according to the range information of the target.

OPERATION

For clarity and purposes of description, only the effect of echo pulses manifesting a single object will be considered in the following discussion. The exploratory pulses emitted by transmitter 10 produce reflected echo pulses from an object. The deflection amplifier 41, variable time base generator 45, and modulator 12 of the transmitter output circuit are synchronized by system timing unit 18. Let it be assumed that the range of the object is 400 NM from the radar location and that the radial velocity is 15,000 NM per hour. From equation (4), it can be seen that the object will give rise to a Doppler frequency variation of approximately 23 kc. Further, let it be assumed that the target attitude is uncoordinated so that tumbling results. The output of mixer 26 is the IF signal Doppler-shifted by approximately 23 kc. Extraction of the Doppler content of the output signal of mixer 26 is accomplished, as previously established, by coherent memory filter 30. Input signals admitted to delay network 34 following limiting by limiting IF 32 are circulated in the coherent memory filter up to 62 times for each observation, $k$ being equal to 62, and during each circulation the frequencies of all such signals are increased by approximately 31 kc by heterodyner 35. This frequency, it will by remembered, is exactly the reciprocal of the delay $T$ of delay network 34 as required for proper operation of the coherent memory filter. Therefore, at the end of the signal processing period of 2 ms the signals containined in coherent memory filter will occupy a frequency range of 62 (30.9 kc) = 1.923 MC. Equivalently stated, the input signal will have been converted at the end of the processing period into 62 separate signals separated from each other by a constant frequency difference of 30.9 kc. The input signal upon each circulation continues to increase in amplitude during the total processing time of 2 ms, the final 32μs of the period being reserved for determining the spectral content of the Doppler frequency. Ultimately, the final signal applied to low level limiter 37 is a pulse whose time displacement from the beginning of the 32μs readout period is indicative of the Doppler frequency component of the target signal. The coordination of the vertical sweep and the Doppler frequency output signal results in intensity modulation of the electron beam of cathode ray tube 40 at the instant the beam is at the point on the cathode ray tube which corresponds to the range and radial velocity of the target. Each pulse intensifying the electron beam of the cathode ray tube will be of short duration but sufficient in length to provide a continuous tracking pattern of the target according to its radial velocity and range.

The composite IF and Doppler frequency signal at the output of mixer 26 is also fed to filter 28 for extracting information regarding the rotational velocity of the target. In a manner previously established, the output of amplifier 52 is a voltage which represents the modulation envelope of the incoming 450 MC reflected signal. Range selector 55 actuated appropriately by the timing pulse of variable time base generator 45 is effective to couple the voltage output of amplifier 52 to the one of its plural output leads which coincides with that area of the cathode ray tube screen on which the spot representing the coordinates of the slant range and radial velocity information appears. As the voltage of amplifier 52 is directed to the appropriate section of optical color filter 54, only that part of the white light exteriorly illuminating optical color filter 54 which is proportional to the rate of the rotational velocity will be seen along the viewing path. Summarizing, the optical properties of optical color filter 54 are affected in accordance with the voltage applied to it, which allows various colors to be transmitted, and the color of light which the color filter 54 passes is indicative of the tumbling rate of the object on which the radar is locked.

Although one embodiment of the invention has been illustrated and described, it will be apparent to those skilled in the art that various changes may be made therein without departing from the spirit of the invention or the scope of the appended claims.

I claim:

1. In a radar moving target indicator system having a transmitter periodically radiating pulses of high frequency radiant energy and a receiver receiving reflections of the energy by an intercepted target and converting said reflections into corresponding video signals, each target when experiencing uncoordinated attitude flight manifesting such instability by uncontrolled tumbling which is evidenced by amplitude modulation characteristics of said video signals, means in said receiver for extracting the amplitude modulation component of video signals resulting from a tumbling target, and display means using the extracted amplitude modulation component for indicating the rate of tumbling.

2. In combination with a coherently related transmitter-receiver radar system including a cathode ray tube having a vertical sweep voltage calibrated in terms of the radial velocity of an object intercepted by high frequency pulses of radiant energy from said transmitter and a horizontal sweep voltage providing a time base calibrated in terms of the desired range of the system, said receiver being receptive of echo signals returned from intercepted objects to produce on said cathode ray tube a visual indicia in the form of a luminous spot whose coordinate position indicates the radial velocity and range of each object intercepted, each object when experiencing uncoordinated attitude flight manifesting such instability by uncontrolled tumbling which appears as amplitude modulation of the echo signals, means in said receiver responsive to said echo signals for separating the amplitude modulation component from said return echo signals, and optical color filter means mounted in front of the display area of said cathode ray tube and subjected to said amplitude modulation component for indicating by the color of light transmitted therethrough the rate of tumbling of the object.

3. A radar receiving system receptive of echo signals returned from intecepted ballistic targets comprising, a cathode ray tube emitting white light when intensity modulated, a receiver responsive to said echo signals for producing visual target data indicia on said cathode ray tube by means of intensity modulation, said missiles in the event of uncoordinated attitude flight manifesting such instability by uncontrolled tumbling manifested by amplitude modulation of said echo signals, filter and detector means for recovering the amplitude modulation component from said echo signals, and an optical color filter overlying the display screen of said cathode ray tube along the viewing path and controlled by said amplitude modulation signals to transmit therethrough only those wavelengths of white light which correspond to the tumbling rate.

4. In a coherent pulse-echo radar system wherein short duration high frequency carrier pulses of radiant energy are returned to a receiver as echo signals and combined with reference oscillations synchronized with the transmitted pulses to produce a series of video pulses containing information characteristics of the object intercepted, said video pulses having an amplitude moduation envelope consistent with the rate of tumbling of the object, said receiver including amplitude modulation detection means for producing a voltage having the same frequency as the modulation envelope of said video pulses, and means using the voltage output of said receiver for indicating the tumbling rate of each object generating said amplitude modulation variations.

5. Radar object-locating apparatus of the type having a transmitter of high frequency-periodically emitted exploratory pulses of radiant energy and a receiver adapted to receive echo signals reflected by moving objects which enter the portion of space assigned to said transmitter for radar coverage comprising, a cathode ray tube having vertical and horizontal deflection sweep voltages synchronized with said transmitter pulses and arranged to present visual indicia thereon by means of intensity modulation video signals which fluoresce the cathode ray tube screen with white light, means for converting the Doppler frequency component contained in said echo signals to an intensity modulating video pulse exciting said cathode ray tube screen at a point indicating the degree of radial velocity of said object and its slant range, each object when experiencing uncoordinated attitude flight manifesting such instability by uncontrolled tumbling evidenced in the echo signals by modulation in amplitude varying proportionally to the tumbling rate, amplitude modulation detection and filtering means responsive to said echo signals for producing a rotational velocity signal proportional to the amplitude modulation component of said echo signals, and an optical color filter mounted in front of said cathode ray tube in a manner to sense the presence of an intensity modulated spot on the screen thereof, said filter being energized by said rotational velocity signals and transmitting therethrough a color characterizing the degree of rotational velocity of the tumbling object.

6. Pulse-echo radar object locating apparatus including a cathode ray tube for producing visual indicia thereon relating data pertinent to an intercepted object, each of said objects when experiencing uncoordinated attitude flight manifesting such instability by uncontrolled tumbling resulting in amplitude modulation of echoes reflected by the object, an optical color filter on which incident light is applied from white light illumination of said cathode ray tube due to intensity modulation of the electron beam, said filter exhibiting the property of birefringence, receiver means for generating an envelope voltage characterizing the degree of amplitude modulation of the echo signals returned by a tumbling object, and means for selectively subjecting said optical color filter to said envelope voltage to vary the color of light transmitted by said filter in direct proportion to the tumbling rate of the object.

7. In a radar moving target indicator system having a transmitter periodically radiating pulses of high frequency radio energy and a receiver receiving reflections of the energy from an intercepted target which when experiencing uncoordinated attitude flight manifests such instability by amplitude modulation of the returned echo signals, said receiver converting said amplitude modulated echo signals to corresponding video pulses having the same frequency as the modulation envelope of the echo signals, a cathode ray tube receiving a vertical deflection voltage calibrated in terms of the anticipated radial velocity of intercepted objects and a horizontal deflection voltage providing a time base proportional to the predetermined range of the system, said video pulses containing a Doppler frequency component, means responsive to said video pulses for extracting the Doppler frequency component of said signals in the form of a pulse whose separation from a predetermined time reference is linearly related to the radial velocity, said radial velocity pulse being applied to the intensity modulation electrode of said cathode ray tube in a manner to produce beam intensification resulting in a brightly luminous spot coordinating the range and radial velocity data, an optical color filter placed to sense each intensity modulated spot appearing on the screen of said cathode ray tube, said filter having the property of birefringence so that light incident on said filter appears on the viewed side of said filter at a wavelength determined by the degree of the exciting field intensity, and said color filter being subjected to the amplitude modulation rotational velocity voltage to vary the color of light transmitted through said filter in accordance with the tumbling rate of the intercepted object.

8. In a coherent pulse-echo radar object location system wherein short duration high carrier frequency pulses of radiant energy are transmitted and echo pulses returned from a tumbling object having a radial velocity relative to the transmitter are combined with reference oscillations synchronized with said transmitted pulses to produce a series of video pulses having an amplitude modulation envelope characterized by the rate of tumbling and a Doppler frequency component proportional to the object radial velocity, first means receiving said video pulses for extracting a first signal proportional to the radial velocity of the object, second means receiving said video pulses for extracting a second signal directly related to the amplitude modulation envelope developed in accordance with the tumbling rate, a cathode ray tube having applied vertical and horizontal deflection voltages for vectorially resolving the position of the electron beam under intensity modulation of the intensifying electrode, said first signal being applied to said intensifying electrode of said cathode ray tube to produce a brightly luminous spot on the screen of the cathoe ray tube oriented visually in range and radial velocity, an optical color filter exhibiting the property of birefringence mounted in front of said cathode ray tube in such a manner to sense the presence of intensity modulated spots appearing thereon, and said color filter being energized by said second signal whereby the color transmitted by said color filter provides a visual demonstration of the tumbling rate of the intercepted object.

* * * * *